United States Patent [19]

Butler

[11] Patent Number: 5,607,016
[45] Date of Patent: Mar. 4, 1997

[54] PROCESS AND APPARATUS FOR THE RECOVERY OF HYDROCARBONS FROM A RESERVOIR OF HYDROCARBONS

[76] Inventor: Roger M. Butler, 7 Bayview Drive S.W., Calgary, Alberta, Canada, T2V 3N7

[21] Appl. No.: 422,165

[22] Filed: Apr. 14, 1995

Related U.S. Application Data

[63] Continuation-in-part of Ser. No. 149,237, Nov. 9, 1993, Pat. No. 5,407,009.

[30] Foreign Application Priority Data

Oct. 15, 1993 [CA] Canada .................................. 2108349

[51] Int. Cl.$^6$ .............................. E21B 43/22; E21B 43/40
[52] U.S. Cl. .............................. 166/263; 166/50; 166/266; 166/268
[58] Field of Search ............................... 166/50, 52, 263, 166/266, 268, 271, 306

[56] References Cited

U.S. PATENT DOCUMENTS

| | | | |
|---|---|---|---|
| 2,718,262 | 9/1955 | Binder, Jr. .............................. | 166/268 |
| 2,910,123 | 10/1959 | Elkins et al. .............................. | 166/271 |
| 3,823,777 | 7/1974 | Allen et al. .............................. | 166/266 |
| 3,837,399 | 9/1974 | Allen et al. .............................. | 166/266 |
| 3,913,672 | 10/1975 | Allen et al. .............................. | 166/263 |
| 4,008,764 | 2/1977 | Allen .............................. | 166/266 |
| 4,067,391 | 1/1978 | Dewell .............................. | 166/303 |
| 4,223,728 | 9/1980 | Pegg .............................. | 166/266 |
| 4,344,485 | 8/1982 | Butler .............................. | 166/271 |
| 4,379,592 | 4/1983 | Vakhnin et al. .............................. | 299/2 |
| 4,385,662 | 5/1983 | Mullins et al. .............................. | 166/50 X |
| 4,410,216 | 10/1983 | Allen .............................. | 166/50 X |
| 4,434,852 | 3/1984 | Morel et al. .............................. | 166/268 X |
| 4,501,326 | 2/1985 | Edmunds .............................. | 166/272 |
| 4,598,770 | 6/1986 | Shu et al. .............................. | 166/245 |
| 4,687,058 | 8/1987 | Casad et al. .............................. | 166/263 |
| 4,794,987 | 1/1989 | Kokolis et al. .............................. | 166/50 X |
| 4,834,179 | 5/1989 | Kokolis et al. .............................. | 166/50 X |
| 5,065,821 | 11/1991 | Huang et al. .............................. | 166/263 X |
| 5,148,869 | 9/1992 | Sanchez .............................. | 166/303 |
| 5,273,111 | 12/1993 | Brannan et al. .............................. | 166/50 X |

OTHER PUBLICATIONS

A new process (VAPEX) for recovering heavy oils using hot water and hydrocarbon vapour, Roger M. Butler, and Igor J. Mokrys, Jan.–Feb. 1991, vol. 30, No. 1, pp. 97–106.

Recovery of Heavy Oils Using Vapourized Hydrocarbon Solvents: Further Development of the Vapex Process, R. M. Butler and I. J. Mokrys, The Journal of Canadian Petroleum Technology, Jun., 1993, vol. 32, No. 6, pp. 56–63, together with preprint thereof dated Oct. 7–9, 1991.

In–Situ Upgrading of Heavy Oils and Bitumen by Propane Deasphalting: The Vapex Process, I. J. Mokrys and R. M. Butler, U of Calgary, Society of Petroleum Engineers, Inc., paper No. SPE 25452, Mar. 21–23, 1993, Oklahoma City, OK, U.S.A., pp. 409–424.

(List continued on next page.)

Primary Examiner—George A. Suchfield
Attorney, Agent, or Firm—Anthony R. Lambert

[57] ABSTRACT

A method for the recovery of hydrocarbons from a reservoir of hydrocarbons including injecting a hydrocarbon solvent into the reservoir along with a displacement gas to mobilize hydrocarbons in the reservoir of hydrocarbons; and producing mobilized hydrocarbons from the reservoir of hydrocarbons. The hydrocarbon solvent is injected along one or more predominantly horizontal injection wells in the aquifer that are spaced from the production well or wells. The hydrocarbon solvent is a hydrocarbon solvent selected from the group consisting of ethane, propane, butane. Apparatus for the recovery of hydrocarbons from a reservoir of hydrocarbons includes at least a first and preferably several injection wells drilled into the reservoir, the injection wells having a portion open to fluid communication with the reservoir; and at least a first production well and preferably several production wells drilled into the reservoir, and spaced below the injection wells, the first production well including a pump for pumping oil from the well. A solvent recovery system is also preferably connected between adjacent injection wells and production wells.

24 Claims, 10 Drawing Sheets

OTHER PUBLICATIONS

Thermal Recovery of Oil and Bitumen, Roger M. Butler, Copyright 1991, Prentice–Hall, Inc., Chapter 7, Steam–Assisted Gravity Drainage, pp. 285–359.

The rise of interfering solvent chambers: solvent analog model of steam–assisted gravity drainage, Igor J. Mokrys and Roger M. Butler, The Journal of Canadian Petroleum Technology, Mar. 1993, vol. 32, No. 3, pp. 26–36.

Solvent Analog Model of Steam–Assisted Gravity Drainage, R. M. Butler and Igor J. Mokrys, AOSTRA Journal of Research, vol. 5, No. 1, Winter 1989, pp. 17–32.

Further Studies of the "VAPEX" Process Using a Hele–Shaw Cell, By Swapan K. Das and Roger M. Butler, Petroleum Society of CIM, Paper No. CIM 93–50, May 9–13, 1993, Calgary, Alberta, Canada, 15 pages.

The production of conventional heavy oil reservoirs with bottom water using steam–assisted gravity drainage, S. Sugianto and R. M. Butler, The Journal of Canadian Petroleum Technology, Mar–Apr., 1990, vol. 29, No. 2, pp. 78–86.

Vapex Development Phase 3, Third 6 monthly progress review, Jun. 8, 1993, Roger Butler, Igor Mokrys, Swapan Das, Frans Greebe, Clarence Urness, Ron Turner, Pat Stuart, 35 pages.

Closed–Loop Extraction Method for the Recovery of Heavy Oils and Bitumens Underlain by Aquifers: The Vapex Process, R. M. Butler and I. J. Mokrys, University of Calgary, presented at the Fifth Petroleum Conference of the South Saskatchewan Section, The Petroleum Society of CIM, held with Canmet in Regina, Oct. 18–20, 1993, 17 pages.

PROCESS AND APPARATUS FOR THE RECOVERY OF HYDROCARBONS FROM A RESERVOIR OF HYDROCARBONS

CROSS-REFERENCE TO RELATED PATENT APPLICATIONS

This application is a continuation in part of application Ser. No. 08/149,237 filed Nov. 9, 1993, U.S. Pat. No. 5,407,009.

FIELD OF THE INVENTION

This invention relates to processes and apparatus for the recovery of hydrocarbons from reservoir of hydrocarbons.

BACKGROUND AND SUMMARY OF THE INVENTION

The recovery of heavy oils using horizontal wells has been carried out on an increasing scale in Canada and other countries in recent years. Typical practice in fields such as those in Winter, Senlac, Long Lake, Cactus Lake and Haytar, all in Canada, involves the construction of horizontal production wells about 1000 m in length at the top of the reservoir. Oil is produced by pumping and the recovery is limited eventually by the watering out of the production. Water displaces and replaces the oil as it rises from aquifers lower in the reservoir. The advantage of horizontal wells over conventional, near-vertical ones is that the volume of the reservoir affected by the rising water is much greater and oil is drawn by each well from a larger area. In favourable cases, cumulative production quantities of 100,000 barrels or more of oil are achieved at economic production rates. These are sufficient to more than pay for the cost of the horizontal well and its operation. The disadvantage of the process is that a recovery of only about 5% of the oil in place is achieved. Much of the original oil is left behind in the unswept and water-swept regions.

The inventor has previously proposed an approach for the recovery of heavy oils that involves the use of vaporized solvents such as ethane, propane, or butane. In this method use is made of gravity to cause the oil diluted by the solvent to fall to the base of the reservoir with its initial pore volume becoming filled by solvent vapor. The process is effective if appropriate reservoir conditions can be achieved. In particular, for economic application of the process, it is necessary to have a large mass transfer area available since diffusive mixing is slow. The pressure needs to be close to the vapor pressure of the injected solvent since light hydrocarbon vapors only have a high solubility in the oil when they are close to their dew point. This limited the most economic applications of the process to reservoirs where the pressure can be controlled appropriately, i.e. to about 500 psig for ethane, 110 psig for propane and 20 psig for butane.

Propane has a particular advantage as a solvent for use in such recovery techniques because it allows the precipitation of considerable asphaltene material in the reservoir thus producing an upgraded, less viscous, and more valuable oil product. For propane to be used by itself at normal reservoir temperatures a pressure of the order of 110 psig is required.

In a previous application for patent, the inventor proposed a process that uses saturated hydrocarbon solvent vapor (typically ethane or propane) in conjunction with horizontal wells to mobilize and recover viscous oils and bitumens from reservoir of hydrocarbons in which a bottom water zone (aquifer) is used to deliver the solvent vapor to the base of the reservoir. A hydrocarbon solvent in the vapor phase is preferably injected at reservoir temperature into an aquifer underlying the deposit. The hydrocarbon solvent vapor is essentially insoluble in water, while strongly soluble in oil, with the consequence that there are no heat or material losses to the water layer. Furthermore, the water in the bottom water zone will be mobilized and underride the lighter diluted oil and assist in moving it towards the production well. Use of this process produces a much larger interfacial area for mass transfer. However, the pressure requirement probably limits the general applicability of using propane alone in such a method to relatively shallow bitumen reservoirs.

In this patent document, a further improvement of the above described hydrocarbon recovery process includes the injection of a non-condensible displacement gas into a reservoir with a hydrocarbon solvent. The displacement gas should be at a pressure sufficient to limit the rate of ingress of water into the recovery zone to a small manageable value. The process is operated so that some of the injected displacement gas is produced from the horizontal production wells located at the base of the reservoir. The injection may be into the bottom water layer if this exists or, if it is practical (as it usually will be with conventional heavy oils but not with bitumen), into horizontal injection wells located at the top of the reservoir, parallel to and probably displaced horizontally from the producers. Gas is injected into the reservoir from these wells and the production is controlled so that there is a net but manageable small flow of gas from injector to producer. In conventional reservoirs such an operation may produce a small recovery of heavy oil by itself, but this will be limited because of the tendency of the low viscosity gas to flow through the oil as fingers and bypass it. The hydrocarbon solvent should be a liquefied but vaporizable solvent such as butane or propane. Confined evaporation of this liquid solvent in the displacement gas maintains a concentration of solvent vapor in the gas phase. The rate of injection of liquefied solvent is preferably controlled so that essentially all of the solvent is vaporized before the gas stream reaches the production well. This vaporized solvent diffuses within the gas fingers and dissolves into the heavy oil reducing its viscosity. The diluted oil becomes mobile and accumulates at the bottom of the gas fingers so as to tend to seal them off. However the steady flow of gas results in displacement and diluted oil is produced. The rate of injection of liquefied solvent is controlled so as to maintain a practical concentration in the produced oil (2–50% by weight).

A limitation of this approach can be that the fingers of gas produced by the initial injection sweep only a small volume of the reservoir and, as a result, there is only a limited interfacial area for the solution of the vaporized solvent into the bitumen. Mixing is limited and, as a result, the production rate may be limited. Therefore, in a further aspect of the invention, use is made of the flow channels that have been developed in a reservoir that has been previously produced by conventional water displacement of the type described above. In the water-flooded reservoir there are numerous passages in which water has been flowing through the oil sand. In this further aspect of the invention, the displacement gas is injected with liquefied but vaporizable solvent into the horizontal well(s) already located at the top of the reservoir and to displace the water downwards to new horizontal production wells drilled at the base of the reservoir, parallel to the injectors. The producers may be located directly below each injector or in between. Non-condensible gas is allowed to flow through these interconnected passages and to displace water to the production well. Again, as in the previous processes, the pressures are arranged so that there may be a small inflow of fluids from outside the recovery region but only at a controllable rate. The liquefied but vaporizable solvent such as propane or butane is injected at a rate controlled to provide a practical concentration of solvent in the produced fluids (2–50% by weight).

An important advantage of the process is that the tendency for the vaporized solvent to rise will cause the swept region to increase in size upwards.

The solvent is recovered from the produced oil and recycled to the injectors. It is believed that significant increase in recovery from horizontal well projects in areas such as Lloydminster, Alberta, Canada, can be achieved by use of this invention.

There is thus provided in accordance with one aspect of the invention, a method for the recovery of hydrocarbons from an underground reservoir of hydrocarbons, the method comprising the steps of:

- injecting a displacement gas and a liquid vaporizable hydrocarbon solvent into an injection well lying in the underground reservoir to mobilize hydrocarbons in the underground reservoir; and
- producing mobilized hydrocarbons together with displacement gas and liquid vaporizable hydrocarbon solvent from a production well lying in the underground reservoir spaced from the injection well.

In another aspect of the invention, the displacement gas is injected into the injection well until a communication path is established between the injection well and the production well and then the liquid vaporizable hydrocarbon solvent is injected along with the displacement gas.

Preferably, the mobilized hydrocarbons are produced along a predominantly horizontal production well in the underground reservoir.

In another aspect of the invention, where the reservoir has previously been produced by an existing horizontal production well lying at the top of the underground reservoir, the displacement gas is injected into the existing production wells, and in addition, production wells are created by drilling a new production well into the underground reservoir below the existing production well.

Methane and nitrogen are preferred for the displacement gas while butane and propane are preferred for the liquid vaporizable hydrocarbon solvent.

In a further aspect of the invention, there is provided apparatus for the recovery of hydrocarbons from a reservoir of hydrocarbons, the apparatus comprising:

- a source of liquid vaporizable hydrocarbon solvent;
- a source of displacement gas;
- a first injection well drilled horizontally into the reservoir, the injection well having a portion open to fluid communication with the reservoir and being connected to the source of liquid vaporizable hydrocarbon solvent; and
- a first production well drilled horizontally into the reservoir, and spaced from the injection well, the first production well including a pump for pumping oil from the well.

A solvent stripper is preferably connected between the first injection well and the first production well.

In another aspect of the invention, a method is provided for the production of hydrocarbons from a reservoir of hydrocarbons having a first horizontal well drilled into the reservoir of hydrocarbons, the method comprising the steps of:

- drilling a second horizontal well into the reservoir of hydrocarbons spaced from the first horizontal well;
- establishing a communication path with flow of displacement gas from the first horizontal well to the second horizontal well;
- injecting a hydrocarbon solvent into the reservoir of hydrocarbons through the first horizontal well while injecting displacement gas such that hydrocarbon solvent in the vapor state is present in the displacement gas in the reservoir; and
- producing hydrocarbons and displacement gas from the second horizontal well.

The hydrocarbon solvent is preferably injected in the liquid phase and vapor from the hydrocarbon solvent preferably saturates the displacement gas. The hydrocarbon solvent is preferably selected from the group consisting of propane and butane.

Further aspects and advantages of the invention are described in the detailed description that follows and set out in the claims that follow.

BRIEF DESCRIPTION OF THE DRAWINGS

There will now be described a preferred embodiment of the invention, with reference to the drawings, by way of illustration, in which like numerals denote like elements and in which.

DETAILED DESCRIPTION OF PREFERRED EMBODIMENTS

In this patent document, a displacement gas is a gas that is non-condensible at reservoir temperature and pressure conditions and that is essentially non-soluble in the reservoir hydrocarbons. Exemplary displacement gases include nitrogen, natural gas and methane, with natural gas, which is normally mostly methane with some other gases such as carbon dioxide, being preferred. A liquid vaporizable hydrocarbon solvent is a hydrocarbon that is liquid at the reservoir pressure and at the reservoir temperature, and has a vapor pressure such that a significant portion of the solvent evaporates in the reservoir. Preferred solvents are mixtures of $C_3$ and $C_4$ hydrocarbons and their olefins and diolefins, including butane, both iso-butane and n-butane. A reservoir is a deposit of hydrocarbons and includes a permeable zone, should it exist, at the base of the reservoir.

Figure 1:
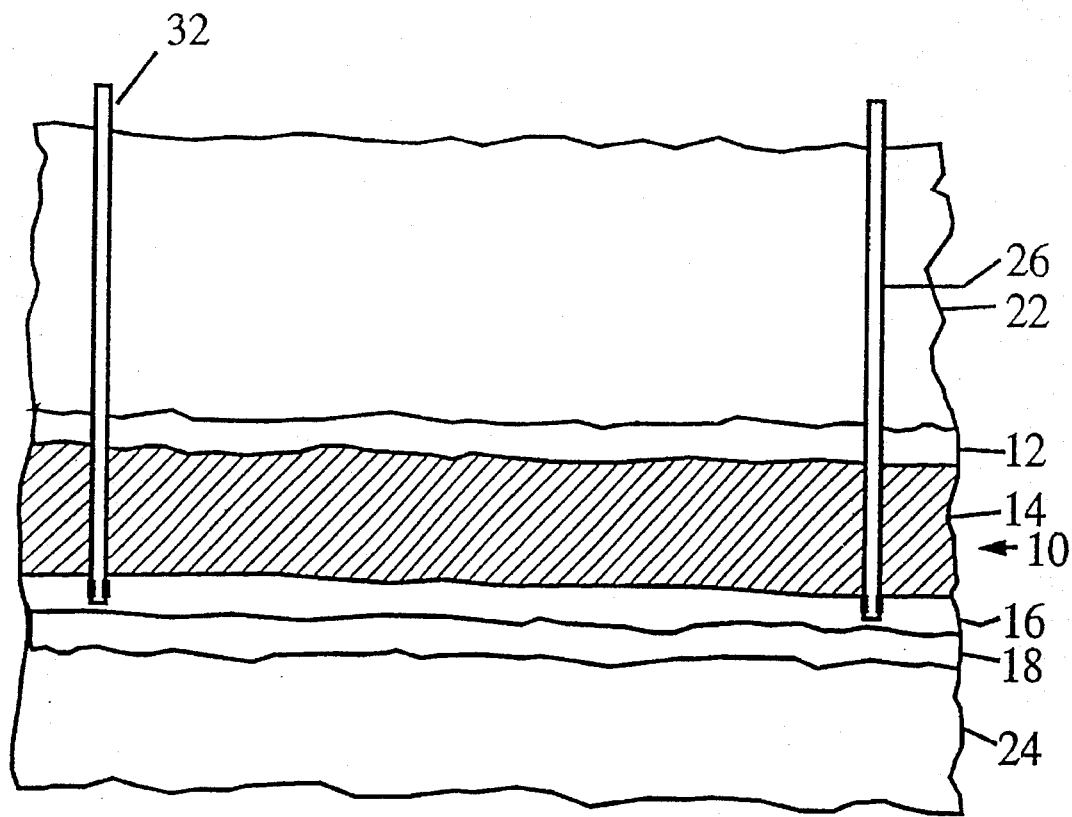
FIG. 1 is a schematic section through a reservoir of hydrocarbons showing the injection of a hydrocarbon solvent vapor in an aquifer underlying the deposit and the recovery of hydrocarbons from another point in the aquifer.

A reservoir of hydrocarbons 10 containing high viscosity hydrocarbons such as heavy crude oil or bitumen is illustrated in FIG. 1 including a reservoir cap 12 and main reservoir 14 lying in a permeable formation or formations below the reservoir cap 12. A permeable layer forming an aquifer 16 underlies the main reservoir 14. The reservoir 10 is bounded from below by a lower boundary 18. Overburden 22 above the reservoir 10 is also illustrated along with underburden 24 below the reservoir 10. The reservoir 10 is exemplary: not all reservoirs will have this structure. As for example there may be no overburden, but a further reservoir of hydrocarbons.

Figure 3A:
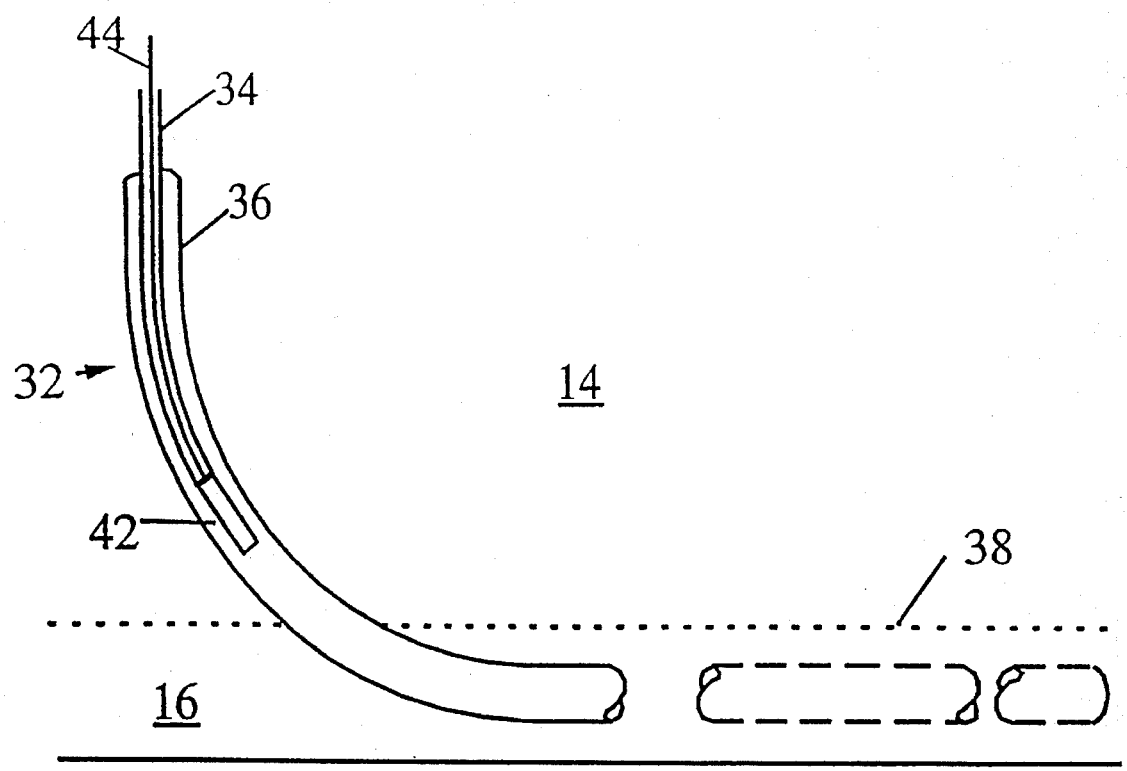
FIG. 3A is a schematic showing an exemplary horizontal production well for use in implementing the method of the invention.
Figure 3B:
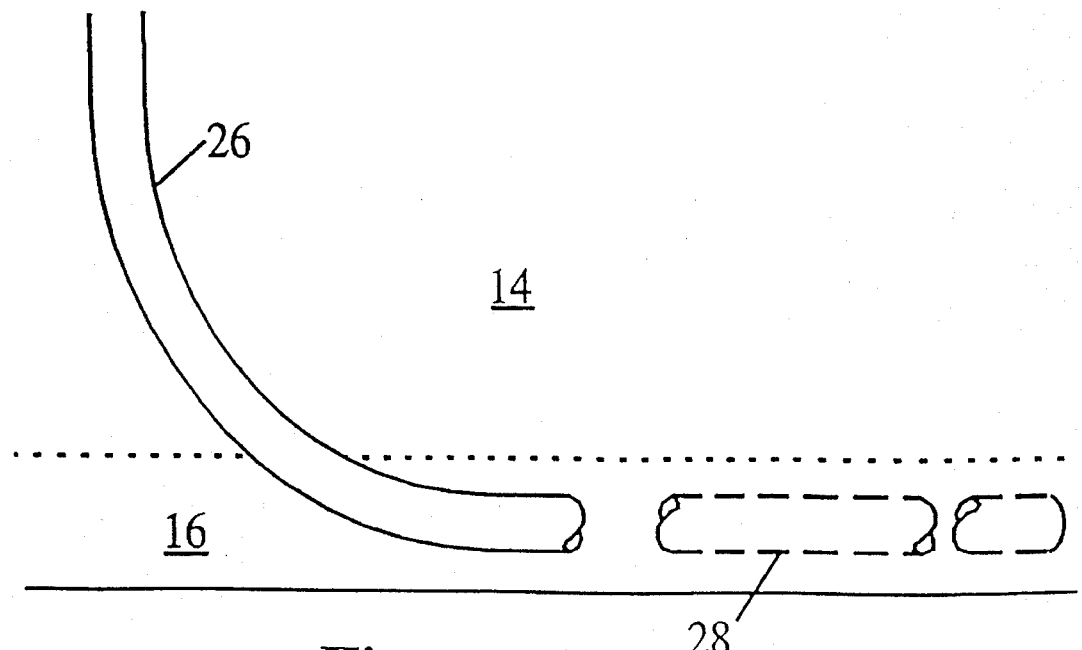
FIG. 3B is a schematic showing an exemplary horizontal injection well for use in implementing the method of the invention.
Figure 7:
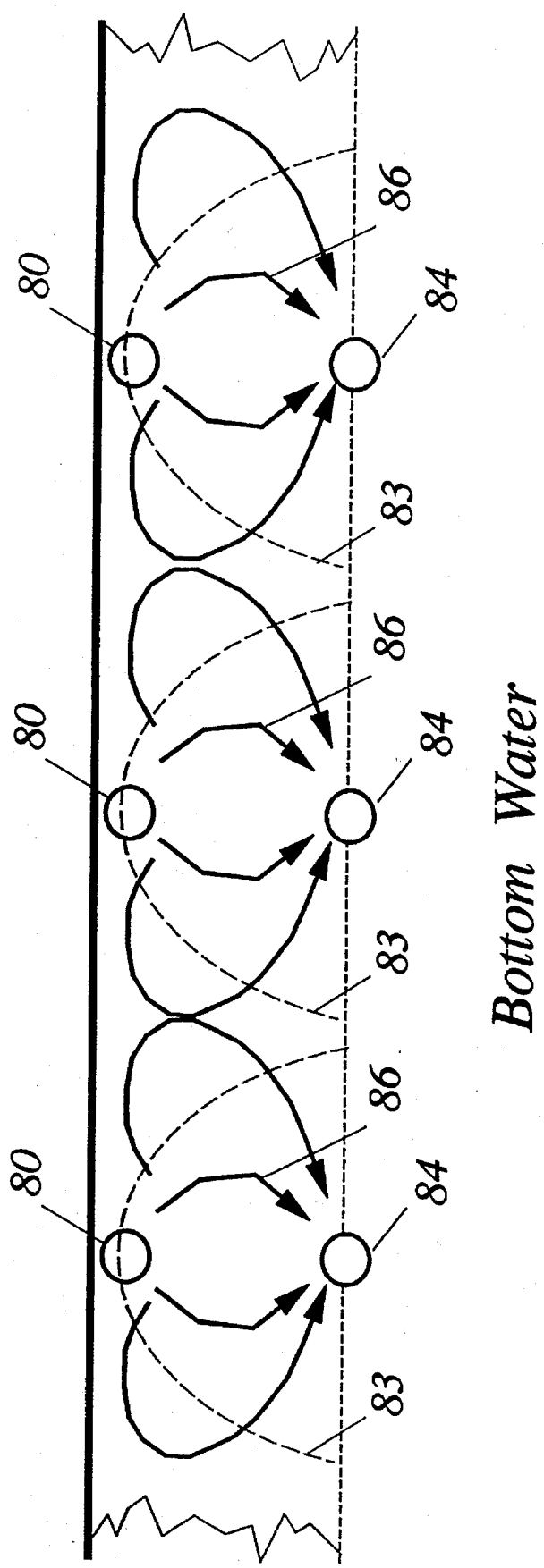
FIG. 7 is a schematic showing application of an embodiment of the method of the invention to a field that was previously produced by horizontal production wells.

As illustrated in FIGS. 1 and 3B particularly, a horizontal injection well 26 is drilled into the reservoir 10 using known techniques. This well may be drilled into an aquifer at the base of the reservoir 10, but may also be elsewhere in the reservoir, for example at the top of the reservoir as illustrated in FIG. 7. Horizontal well lengths should be at least 10 m and preferably more than 100 m, depending on the reservoir. That part of the well 26 lying in the reservoir 10 or in the permeable layer 16 is open to the reservoir 10 such as by perforation of the well casing as shown at 28. The horizontal portion of the well 26 may be as long as feasible. The horizontal injection well may be placed anywhere within the reservoir, but preferred locations are at the top, or the bottom. Various factors will dictate which is preferred. For example, the existence of an underlying aquifer suggests placing the injection well in the aquifer. Yet, if the reservoir has previously been produced from horizontal wells lying in the top of the reservoir, these may be used for injection in combination with a production well in the base of the reservoir.

A horizontal production well 32, with tubing 34 and casing 36, is also drilled using conventional techniques into the reservoir 10, and extends laterally into the permeable layer 16 as illustrated particularly in FIGS. 1 and 3A. A significant length of the production well 32 lying horizontally in the permeable layer 16 is open, as for example by using a slotted liner in portion 38 of the well, to the reservoir 10. A pump 42 is located in the inclined portion of the well 32. The pump 42 may be for example a conventional sucker rod reciprocating pump (as illustrated with sucker rod 44), rotary positive displacement pump, electrically driven pump, or other suitable pump. The pump 42 pumps production oil from the casing 36 up the tubing 34 to the surface where it is produced in conventional manner. As with the injection well, the production well may be located elsewhere in the reservoir, but production from the bottom or near the bottom of the reservoir is preferred.

Figure 2:
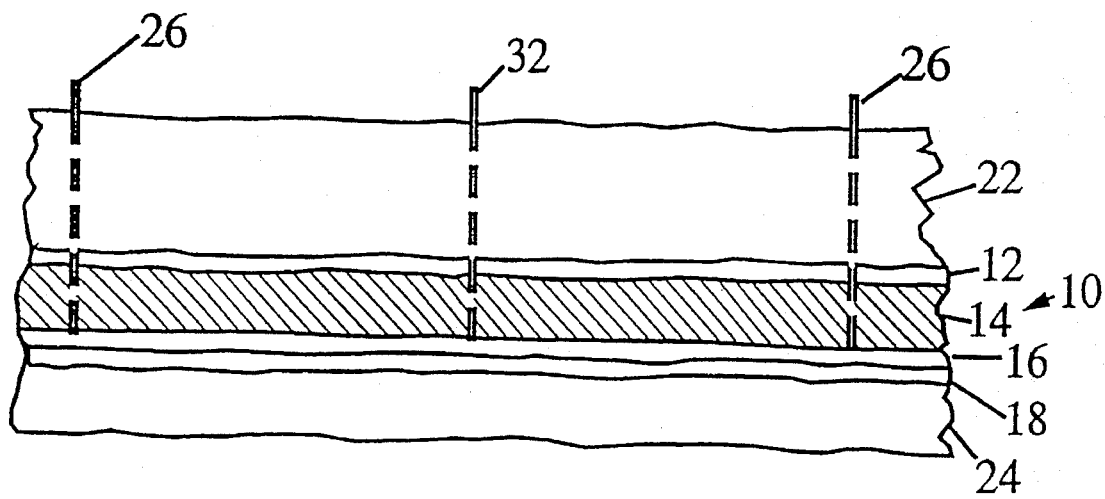
FIG. 2 is a schematic section showing an array of parallel horizontal wells in an aquifer below a reservoir of hydrocarbons with alternating wells used for vapor injection and hydrocarbon recovery.

As illustrated in FIG. 2, particularly in the case where injection and production wells are in a permeable layer at the base of the reservoir 10, the injection wells 26 and production wells 32 may be spaced approximately parallel to each other and alternate with each other. Alternatively, the injection wells 26 may be located above the production wells 32 as illustrated in FIG. 7, or they may be variably placed across the reservoir, the constraint being that there should be fluid communication between injection wells and corresponding production wells.

Liquid vaporizable hydrocarbon solvent is injected in the liquid phase along with a displacement gas, such as nitrogen or methane, into the injection well to mobilize at least a portion of the hydrocarbons in the reservoir of hydrocarbons 10. The injection pressure is selected so that the pressure of the gas is below the reservoir pressure. This prevents reservoir hydrocarbons from being pushed away from the production region. The amount of liquid vaporizable hydrocarbon solvent and gas must be controlled to ensure production of the displacement gas and liquid vaporizable hydrocarbon solvent with produced hydrocarbons from the reservoir. The displacement gas is first injected into the injection well until some of the injected gas is produced at the production well. Once fluid communication between the injection and production wells has thus been established, and while continuing to supply displacement gas into the injection well at a rate sufficient to maintain production of displacement gas at the production well, the liquid vaporizable hydrocarbon solvent is injected into the injection well.

The liquid vaporizable hydrocarbon solvent need only be present in an amount necessary to ensure that vaporized hydrocarbon solvent will be available to dissolve in the reservoir hydrocarbons preferably with the produced liquid containing solvent in an amount about 2–50% by weight. Liquid solvent need not be present in a large amount within the region in which extraction is to occur. Transfer of solvent vapour within the gas phase to the oil gas contact by diffusion is an important mechanism. The gas must be injected in an amount necessary to ensure production of gas at the production well and maintain pressure in the reservoir. An essentially constant pressure is maintained on the injected material while gas flow is ensured by the production of free gas with liquids from the production well. Where there is an aquifer present, a small amount of water should also be produced. If water is not produced, solvent may be lost to the aquifer. As the extraction continues much of the pore volume initially occupied by oil is filled with gas.

As the injected fluids contact the reservoir the gas tends to remain saturated with vaporized solvent. Solvent is transferred to the gas phase as vapour and then, as the gas contacts the oil, the oil becomes diluted with the solvent. Thus the solvent becomes gradually dissolved in the oil by evaporation from solvent rich liquid, diffusion in the gas phase and dissolution in non-diluted or less diluted oil. The injected solvent is mostly liquid and it becomes mixed with the oil as it flows to the producing well. The final produced liquid is oil containing dissolved solvent.

The liquid should be present in the amount such that the gas tends to become saturated with solvent vapor. Too much liquid solvent should be avoided since this may cause asphaltene precipitation and plugging of the reservoir.

Figure 5:
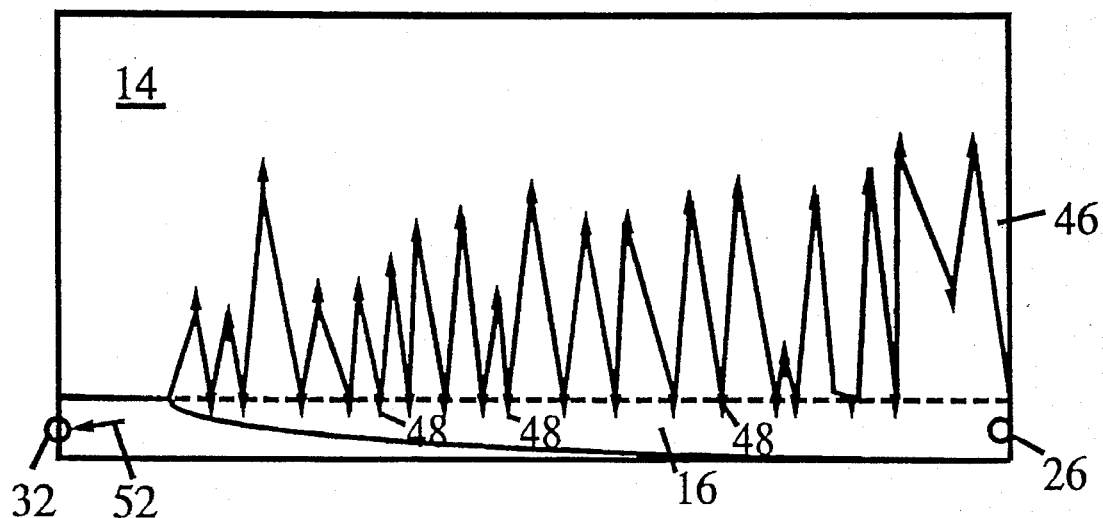
FIG. 5 is a schematic showing fingers of propane vapor rising into bitumen in a reservoir of hydrocarbons, with diluted deasphalted bitumen falling countercurrently so as to drain to a horizontal production well.

In case of injection of the hydrocarbon solvent into the permeable layer 16, the hydrocarbon solvent and gas spreads across the area below the reservoir 10 on either side of the horizontal injection well 26. The gas rises along with solvent vapor, because of gravity, across this area and penetrates the overlying reservoir where the solvent vapor dilutes and deasphalts the oil. Asphaltenes which separate from the oil remain in the bulk of the reservoir. The gas and vapor rises as a multitude of fingers 46 into the reservoir as illustrated in FIG. 5, mobilizing the hydrocarbon in the reservoir 14 and diluted bitumen or heavy crude oil falls countercurrently to the hydrocarbon solvent as indicated by the arrows 48. At the interface between the gas and hydrocarbon solvent vapor and the oil, the vapor condenses into the oil, mobilizing it, and warming it up 0°–5° C.

The diluted hydrocarbon in the reservoir is heavier than the gas and vapor and flows under gravity towards the production well 32, as indicated by the arrow 52 where the mobilized hydrocarbons are produced from the reservoir of hydrocarbons. The interface between oil and vapor rises steadily until the supply of oil has been exhausted, near the top of the reservoir.

Figure 4:
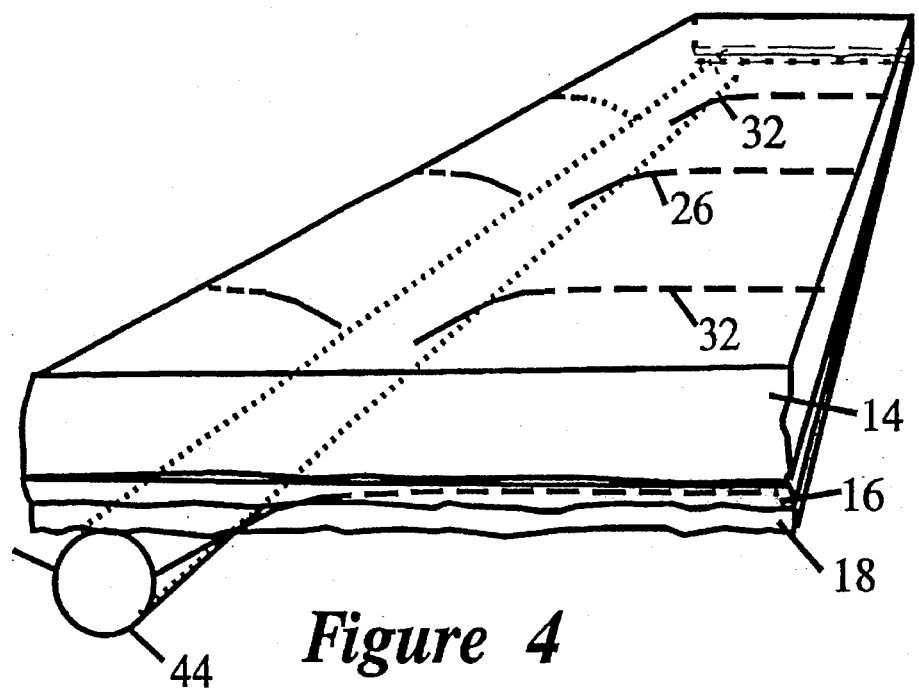
FIG. 4 is a schematic showing apparatus for implementing the method of the invention including an array of parallel wells drilled from an underground tunnel.

As illustrated in FIGS. 2 and 4, the hydrocarbon solvent may be injected along an array of predominantly horizontal injection wells 26 spaced from each other in the aquifer and the mobilized hydrocarbons may be produced along an array of horizontal production wells 32 spaced from each other in the aquifer. The wells 26 and 32 may be drilled from the surface (FIGS. 1 and 2) or from a tunnel 44 (FIG. 4).

In addition, production could be obtained from vertical wells, with a vertical injection well drilled into the aquifer, or any combination of vertical and horizontal wells, so long as they are not so far apart that communication cannot be established between them. However, vertical wells are considerably less effective than horizontal wells since an important aspect of the invention is the establishment of a solvent—oil interface that extends over a wide area.

If there is no pre-existing aquifer underlying the main reservoir, under some conditions, such as where fractures propagate horizontally, a conductive horizontal layer may be initially created at the base of the reservoir of hydrocarbons by hydraulic fracturing of the rock at the base of the hydrocarbon reservoir. Fracturing may also be beneficial to assist in creating communication zones between injection and production wells even in cases where injection of the displacement gas and solvent is not to be into an aquifer. This technique can be used for the recovery of bitumen from shallow reservoirs in the following manner.

Three parallel horizontal wells, such as wells 26 and 32 shown in FIGS. 1–4, are drilled near the base of a shallow bitumen deposit such as those in Athabasca, Alberta, Canada. The depth is chosen so that an operating pressure of the order of 100 psi can be employed without disrupture of the surface. A depth greater than about 400 feet is satisfactory. The depth is also chosen so that when a hydraulic fracture is created within the reservoir, it becomes horizontal rather than vertical. It is well known to those skilled in the art that horizontal fractures form at relatively shallow depths and that there is a depth beyond which fractures tend to be vertical. The exact depth at which this transition occurs depends upon the in situ stresses in the reservoir body. Typically the depth is about 1000 feet. Thus, in this example, a depth of about 600–800 feet is chosen.

The central well of the three is used as an injector and the two flanking wells as producers. In a larger project, many such parallel wells could be employed with alternating injectors and producers.

The first stage in the process, for establishing communication by fracturing, involves the creation of a horizontal fracture extending between the injector and the two producers. This is created by injecting water or another fracturing liquid at a high pressure into the injection well. A fracture opens up and the producers, which are initially shut in, are opened when the wellbore pressure rises above the reservoir pressure. However, the wells are throttled so as to maintain a high pressure in the wellbore. During this phase, the injection of water (or other fracturing fluid) is continued.

After the flow of water has been established, a mixture of butane and a less soluble gas such as natural gas or nitrogen is forced into the injector, still maintaining a high pressure. The pressure within the mixture will be above the vapor pressure of butane at reservoir temperature. This flow of gas is continued until a significant volume of butane-diluted bitumen has been produced at each of the production wells. During this time, these wells are throttled so that the pressure in the fracture remains high to help keep it open.

Once sufficient bitumen has been produced to indicate that a channel has been leached above and, to a lesser extent, below the fracture in the reservoir sand, then the pressure in the production wells is reduced gradually towards the normal operating pressure; this will usually be above the vapour pressure of butane at the reservoir temperature. As has been described previously, this reservoir temperature will tend, during the process, to rise a few degrees centigrade because of the heat of solution of the butane. At this point, there is a continuous flow of gas and butane in the plane below the reservoir and the process can proceed as described previously.

In summary, a horizontal, approximately planar fracture, is created between injection and production wells by hydraulic fracturing, a mixture of a low solubility gas and butane is introduced into the fracture, sufficient bitumen is leached by the butane to create a flow passage within the matrix above the fracture, and the process described previously is continued.

By using conditions such as those described above, the pressure within the vapor chamber can be adjusted to less than that in the surrounding reservoir and, as a result, there will be no tendency for the valuable vaporized solvent to escape into the reservoir. Rather, bitumen under pressure will tend to flow towards the extraction chamber, albeit very slowly.

The hydrocarbon solvent is taken from the group of light hydrocarbons, such as ethane, propane, butane or other low boiling point hydrocarbons, hydrogen sulphide, and other materials having suitable vapor pressure characteristics and solvency, as well as their mixtures. Hydrocarbon solvent in this context does not necessarily mean that the solvent is a hydrocarbon, but that the solvent is capable of dissolving hydrocarbons. However, propane and butane are preferred.

Figure 6:
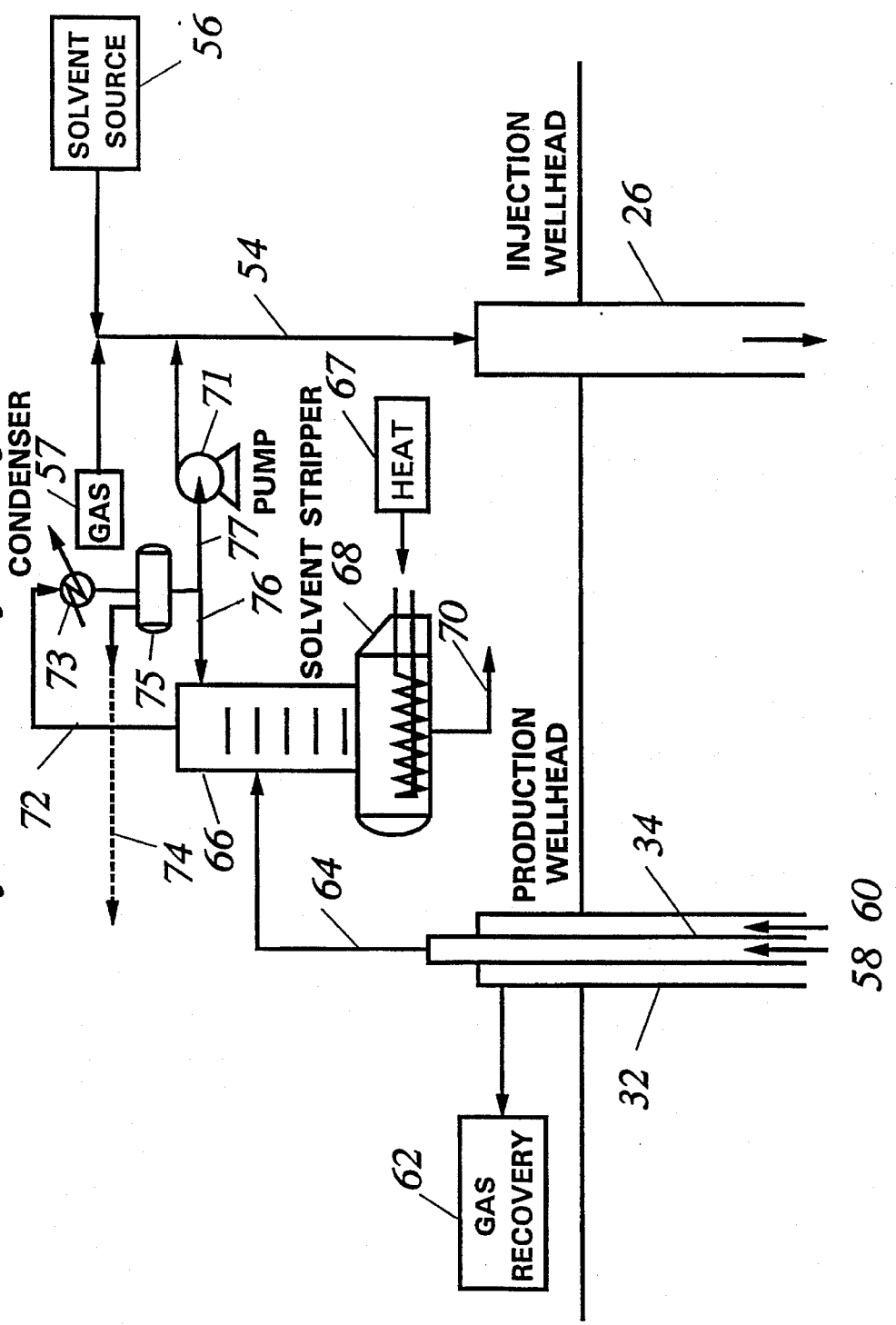
FIG. 6 is a fluid flow schematic showing a closed loop extraction process for use with the invention.

A recovery and recycling system for the hydrocarbon solvent vapor is illustrated schematically in FIG. 6. The system is composed of injection well 26, production well 32, solvent stripper 66 connected between the wells 26 and 32, a gas recovery system 62, a make-up solvent source 56 and a gas make-up source 57. Injection well 26 is drilled into the reservoir and is fed by solvent/gas line 54 from a solvent source 56 and gas source 57, or by recycled solvent from stripper 66 depending on the amount of solvent recycled and the injection requirements. Recycled solvent is taken off the stripper 66 in gas form through line 72, and condenser 73 to distillate drum 75 whence it may be pumped back to the stripper 66 on line 76 through a pump (not shown) or into the well via line 77 and pump 71. Gas dissolved in the solvent may be taken off the distillate drum 75 along line 74. The hydrocarbon solvent and gas is injected into the aquifer by the well 26 with pressure controlled by the pressure of gas source 56. The pressure required to lift the produced liquids arises from the action of pump 42. Mobilized production oil is forced by the pump 42 of FIG. 3A through tubing 34 of the production well 32 as indicated by the arrow 58. Gas produced along with the oil flows through the annulus between the tubing 34 and casing 36 as indicated by the arrow 60 to a gas recovery system 62 of conventional design. Removal of reservoir and some chamber gas is believed desirable since it is believed to assist in keeping diluted bitumen flow channels open. Removal of gas from the casing preferentially removes more volatile gases such as methane and carbon dioxide. The produced gas can be recycled by compression.

Liquid production under pressure from pump 42 is pumped along line 64 to solvent stripper 66. Heat from a source 67 is applied to the production liquid through reboiler 68. Oil is produced along line 70 leading from reboiler 68, and solvent vapor is returned along lines 72 from the stripper 66 for injection into the reservoir through injection well 26 as required. The produced oil will be hot and heat may be recovered from the produced oil.

In a preferred embodiment of the invention, illustrated by reference to FIG. 7, the method is applied to a field that has been previously produced by existing horizontal production wells 80 lying at the top of a reservoir 82. Such wells will have water coning such as shown by cone boundaries 83. Production wells 84 are preferably drilled into the base of the reservoir and displacement gas 86 is injected into the existing production wells 80 until communication is established between the wells 80 and the wells 84. Upon communication being established (or before then, with some loss of efficiency) liquid vaporizable hydrocarbon solvent is injected along with the displacement gas into the injection wells 80, and mobilized hydrocarbons are produced from the production wells 84. Although production from production wells 84 below the reservoir may be used, communication can be established between laterally spaced injection wells and production wells, even at the same depth, if communication can be established.

Figure 8:
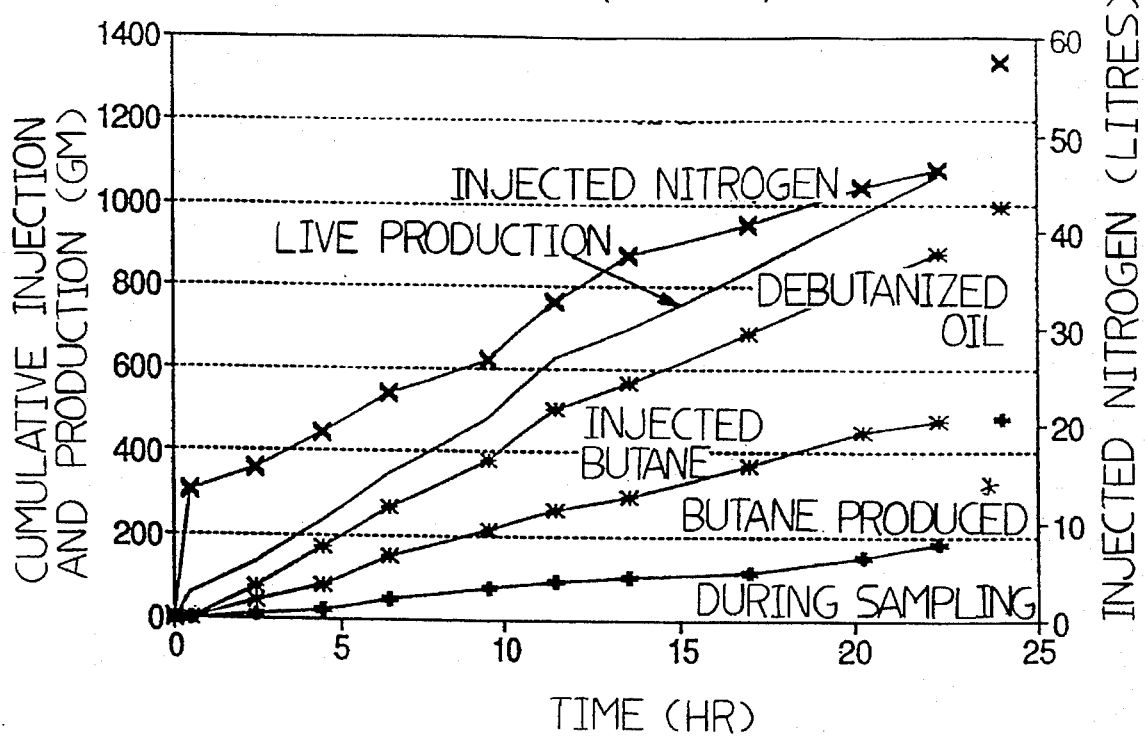
FIGS. 8, 9, 10, 11 and 12 show experimental results obtained from using embodiments of the method of the invention.

In one example using a model of an oil reservoir, the condition of a reservoir with a bottom water layer was simulated. The solvent and nitrogen were injected near the water oil contact at one end of the model and the oil was extracted by upward leaching and produced from another well placed at the bottom of the cell at the other end. The results of this experiment are shown in FIG. 8 in which the curves show, from top to bottom, the amount of nitrogen, live production, debutanized oil, injected solvent and solvent recovered.

In another set of experiments presented here the possibility of using an embodiment of the invention in a sideways leaching chamber was tested. A high pressure, windowed, visual, scaled, physical model was used in the experiments described below. A front perspex plate of the cell allowed visualization of the extraction process. A windowed steel plate supported the perspex plate against the pressure inside the cell. The dimension of the cell cavity was 706.4×205× 31.8 mm. Experimental conditions are summarized in Table 1. Ottawa sand (20–30 mesh) was used as the packing in these examples.

In the experiments, the packed cell is weighed on a load cell. The liquid solvent is supplied at the operating pressure and preset rate using an ISCO syringe pump. Nitrogen is supplied from a cylinder through a mass flow meter. The regulator on the cylinder controls the pressure to the preset operating pressure. Produced oil drains to a collection pot by gravity. As the liquid level in the pot rises production is emptied to glass bottles. The evolved gas is collected in a bubbler over water. The gas bypassed from the top of the collection pot is measured in another bubbler. Compositions of these gas streams are analyzed using a gas chromatograph. A Kitheley-Mertrabyte "DAS-8PGA"™ and "EXP-16"™ data acquisition system is used to record temperatures in the cell and ambient temperature, operating pressures and weight of the cell and display experimental data. In the example #Lex4, but not in the other examples, water was injected at a controlled rate using a "PULSA 7120"™ diaphragm pump.

The scaled cell is vibro packed with 20–30 mesh Ottawa sand and the permeability of the packing measured. The sand pack is flooded with water for sufficient time to remove gas bubbles. The water in the cell is displaced by Lloydminster Tangleflags heavy oil heated to about 50° C. under a low applied pressure (10 psig). The oil filled cell is cooled to the ambient temperature prior to the beginning of the experiment. Weights of the cell noted at different stages of this operation and the displaced water gives the porosity of the packing, water and oil saturation in the cell and the original oil in place.

The cell remains supported by the load cell during the experiment and the weight change during the experiment gives the balance of the injection to and production from the cell. Initially nitrogen is injected at a controlled rate until gas breaks through. Then the liquid solvent and nitrogen are injected simultaneously. The produced oil is collected in a collection pot by gravity. A level indicator attached to the pot shows the fluid level and as the level goes higher the produced fluid is transferred to glass bottles from time to time. During this transfer the pressure on the fluid is reduced to atmospheric and considerable solvent boils off from solution and is collected by downward displacement of water in a graduated cylinder (bubbler). The solvent vapor is also accompanied by small amount of nitrogen. A stream from this gas is passed through the gas chromatograph and the gas composition is analyzed.

To maintain the vertical extension of the vapor chamber throughout the thickness of the reservoir region some gas is continuously bypassed at a controlled rate through the valve on top of the collection pot. This helps in the movement of the carrier gas carrying solvent through the packing to the unextracted crude interface. This vapor is collected in another bubbler and its composition is also analyzed. Results of these chromatographic analyses are used to find the amount of solvent and nitrogen flowing into each stream.

In the experiment #Lex4 the Pulsafeeder pump was connected to the injection line and the line pressurized to the experimental pressure with water at the beginning of the experiment. After initial breakthrough of nitrogen the injection of solvent and nitrogen as above was accompanied by a controlled stream of water. Due to the high capacity of the pump the flow rate of water was greater than desired. As a result water injection was stopped after some time and controlled to a lower rate afterwards. The produced oil was accompanied by water. The oil samples were analyzed by Karl-Fisher technique for the water content and the amount of extracted oil was determined. The results of the experiments were as follows:

Experiment #Butex6

In actual field conditions, pressure may need to be higher than about 0.779–0.814 MPa (100–105 psig). This can be achieved easily by increasing the carrier gas pressure. However, with increase in pressure the diffusion coefficient in the gaseous phase decreases proportionately to the reciprocal of the pressure. Since in this process the butane vapor has to reach the interface by diffusing through the carrier gas the gas phase resistance to diffusion may play a significant role in controlling the process at higher pressure. This experiment was used to study the effect of operating pressure on the process performance. Due to the limited allowable operating pressure of the physical model it was not possible to raise the pressure. Hence in the experiment #Butex6 the pressure was lowered and controlled to 0.434 MPa (50 psig). butane injection rate was maintained at 24.8 g/h and nitrogen was injected at a rate of 2.3 liter/h. Gas and butane were injected at the base of the oil in the model at an oil/water interface. The average production rate was 40.5 g/h compared to 41.7 g/h in a similar Butex experiment where the pressure was 0.779 MPa. The operating pressure did not have significant effect on the production rates over this range.

Experiment #Lex1

Figure 9:
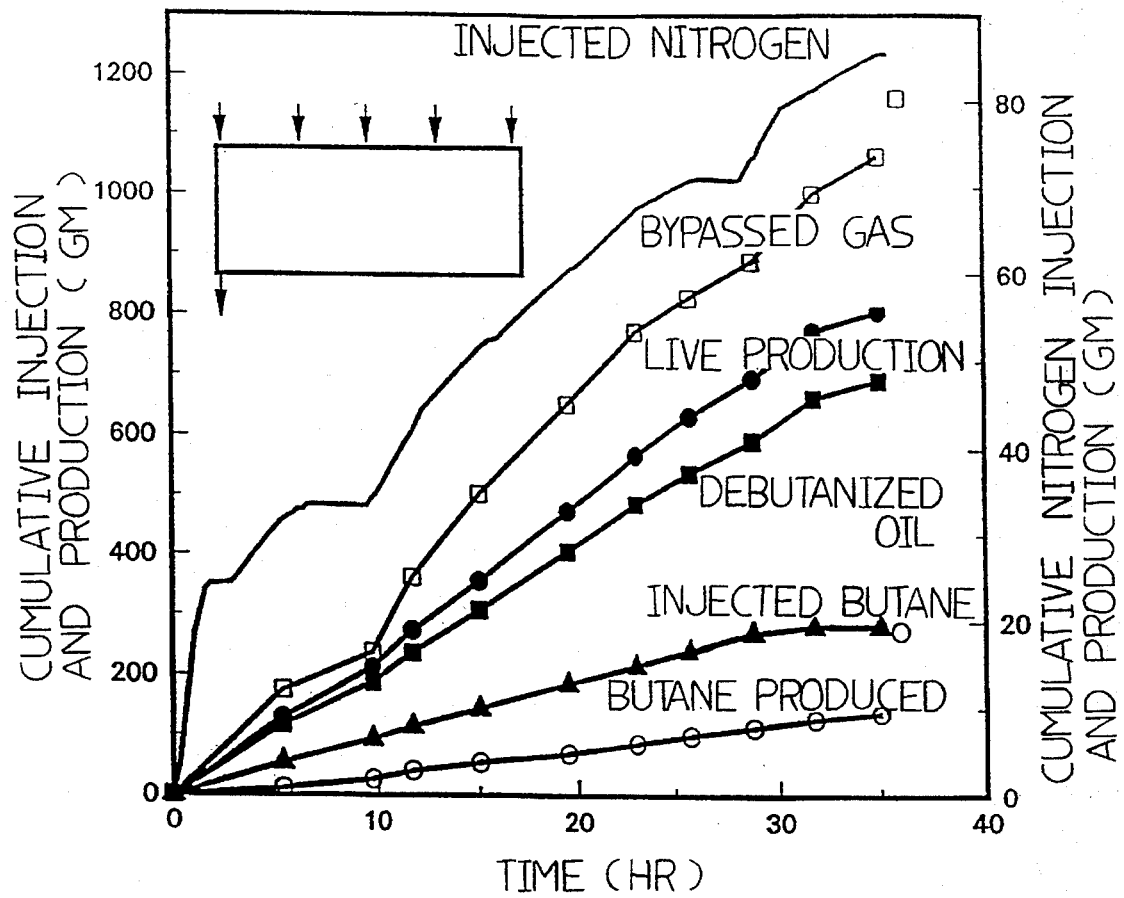

As it is observed in the experiments using butane as a solvent that extraction with liquid butane in the presence of a high pressure gas does not consolidate and plug the sand matrix the same principle can be used in spreading chambers also. This may be useful in reservoirs without bottom water layer. This idea was demonstrated in experiment #Lex1. The experiment started with an oil flooded cell with an almost uniform water and oil saturation (79.1%) everywhere in the pack. Initially Butane with nitrogen was injected at the top of the cell vertically above the production well. The pressure was maintained at 0.779 MPa. At this pressure most of the butane remains in the liquid phase and falls through the vapor chamber to the interface and extracts bitumen. As the chamber spread side ways the butane injection point was moved along the top of the reservoir to promote liquid butane draining along the entire interface. Results of this experiment are presented in FIG. 9. Oil was produced at a rate of 22.4 g/h for a butane injection rate of 9.5 g/h. Nitrogen was injected at a rate of 1.5 liter/hr (about 1.8 g/h). Hence it is possible to use the present method with the pressure above the vapor pressure of the solvent. The vapor chamber is maintained by the non condensible gas maintaining the high density difference of a vapor-liquid system yielding a higher gravity drainage rate and minimizing the net solvent consumption.

Experiment #Lex2

In the experiment #Lex1 movement of the injection point is equivalent to employing a set of closely spaced injection wells along the top of the reservoir; for a thin reservoir this concept may be prohibitively costly to put into practice. Although offset may be possible, achieving initial communication was a concern. The possibility of using propane was also to be tested. In the experiment #Lex2, nitrogen and propane were injected simultaneously using an injection well placed at the top corner of one end of the packing and oil was produced at the bottom corner of the other end as shown in FIG. 10.

The average temperature of the cell during the experiment was 21.5° C. The vapor pressure of propane at the same temperature is 0.879 MPa. Due to the limitation of the cell the operating pressure was maintained at 0.959 MPa. Thus the extraction was being carried with liquid propane being injected and vaporizing into a vapor chamber maintained by nitrogen.

Figure 10:
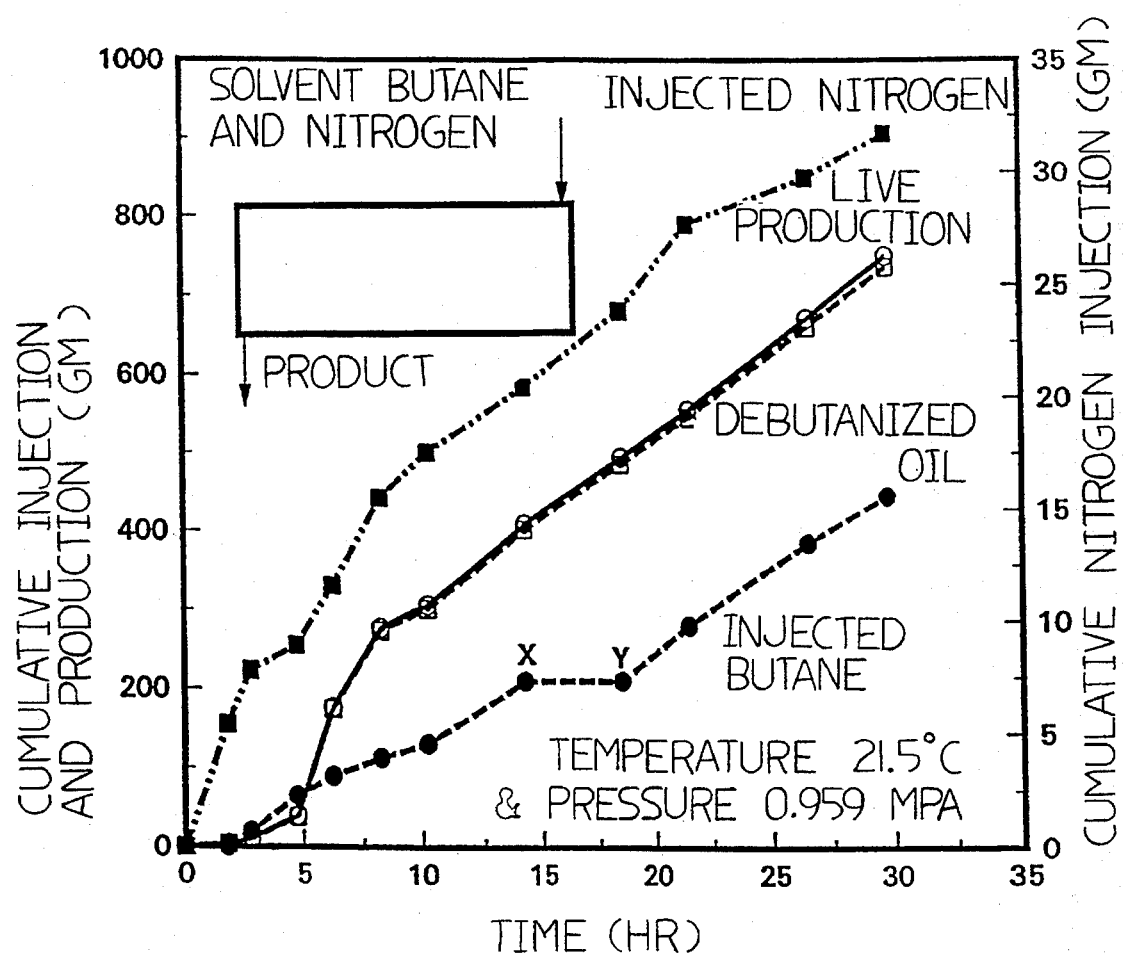

FIG. 10 presents the experimental results. The experiment started with injection of nitrogen gas at the operating pressure. Nitrogen broke through after a short time; the amount of oil produced during the period was very small. This was followed by injection of nitrogen and propane together, rates being 1.25 g/h and 15 g/h respectively. For a very short period after the injection of propane started the oil was produced at a higher rate (50 g/h) indicating that propane was invading through the fingers created by nitrogen and contacting oil over a larger interfacial area. However as those fingers slowly filled with diluted oil the rate slowed down to a typical gravity drainage rate. During the refilling of the ISCO pump, propane injection was stopped between the points X and Y shown in the figure. However the production continued at the uniform rate at 25 g/h, probably due to the presence of accumulated propane in the chamber. Viscosities of the produced oil measured at 20° C. shows a considerable in situ upgrading due to deasphalting with propane.

Experiment #Lex3

Figure 11:
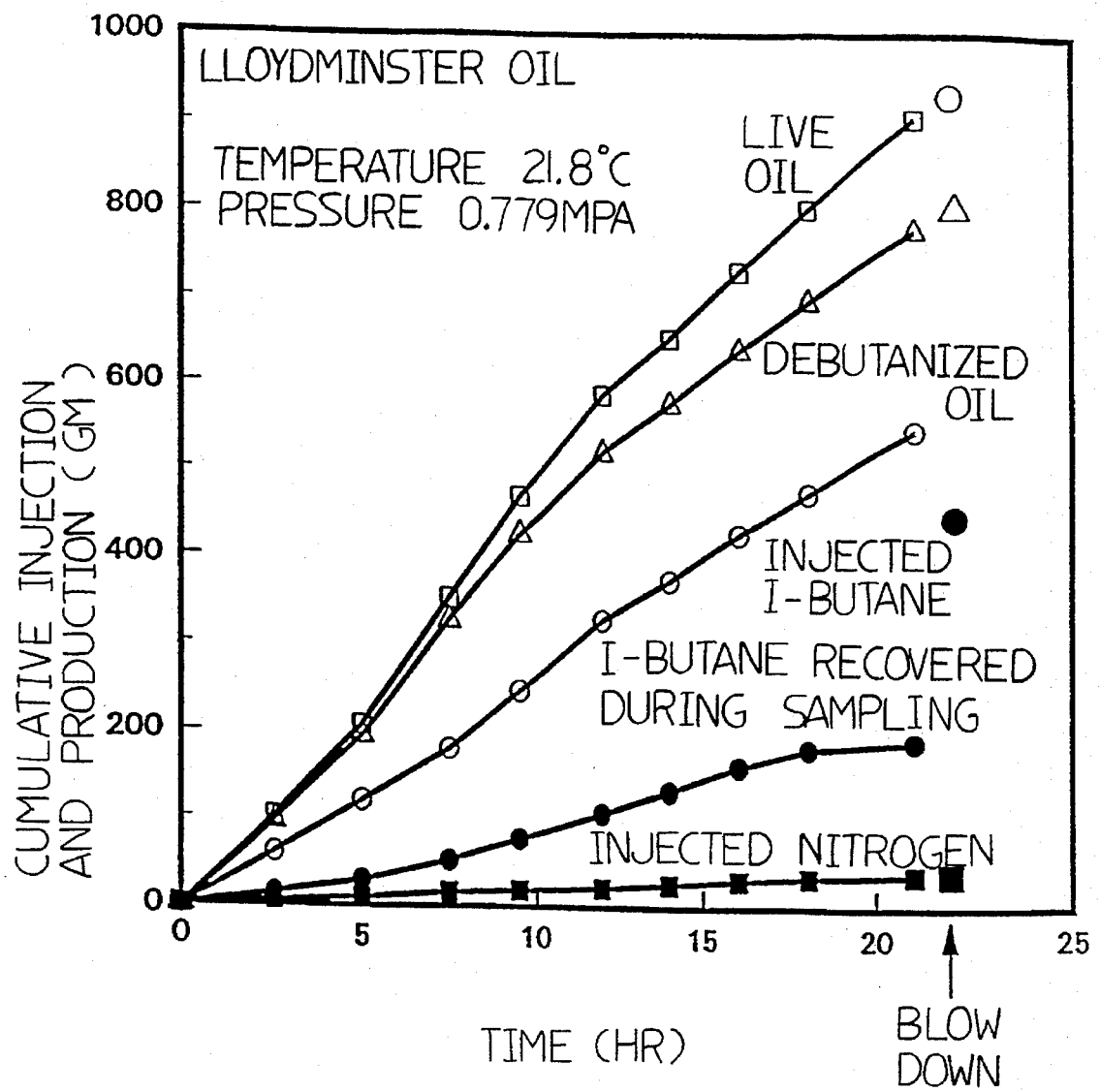

In this experiment i-butane was used as the solvent. The initial breakthrough of nitrogen was followed by injection of nitrogen and liquid i-butane. Results of this experiment are presented in FIG. 11. Nitrogen was injected at a rate of 2.5 g/h and butane injection rate was 24 g/h. After 7.5 hrs butane injection rate was increased to 36 g/h anticipating an increase in the production rate. The production rate was increased slightly as seen in the curve for cumulative production of debutanized oil. However this resulted in lower nitrogen injection rate, higher concentration of solvent in the produced oil and bypassed gas. The solvent injection rate was reduced back to 24 g/h at 12 hrs and continued for the rest of the experiment. The average rate of production is about 40 g/h.

Experiment #Lex4

Figure 12:
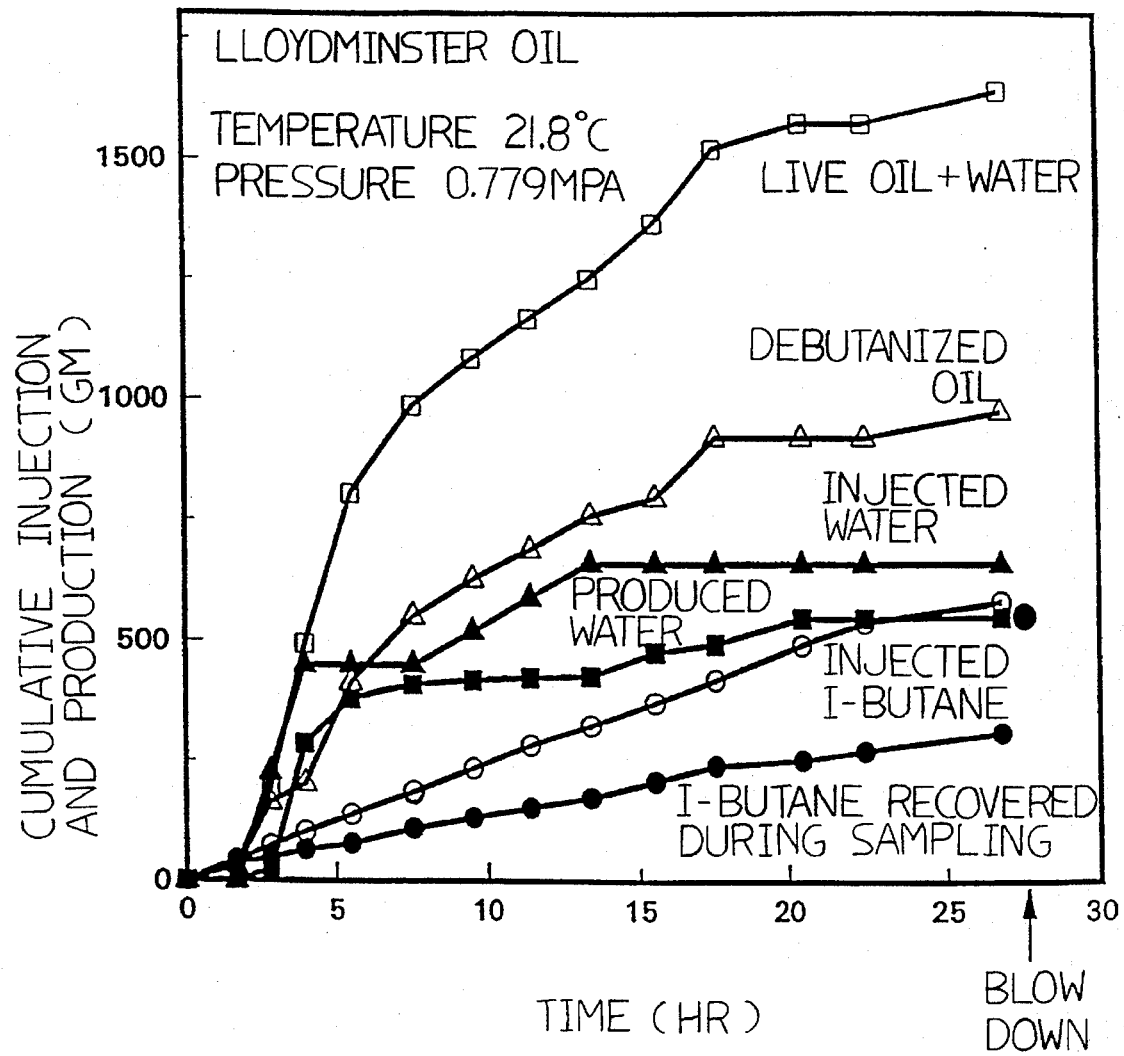

In this experiment the effect of mobile water on the performance of the process was investigated. After breakthrough of nitrogen liquid i-butane, nitrogen and water were injected together. Results of this experiment are presented in FIG. 12. Liquid butane was injected at a rate of 24 g/h and average nitrogen injection rate was about 2 g/h. Initially the water injection rate was about 225 g/h which was stopped at 4 hrs as excessive water was produced with the oil. The water injection pump was adjusted and injection of water started at 7.5 hrs; the injection rate was 70 g/h. The debutanized produced oil was analyzed for water and the amount of cumulative oil is presented in the curve marked debutanized oil. The average rate of production in this experiment is about 58.2 g/h which is approximately 45% enhancement in the production rate. Probably a smooth and slower injection of water would give even better results.

According to these results, the effect of operating pressure was not significant in the range of pressure used. In addition, the method of the invention can be applied to laterally spaced wells (sideways leaching). Both propane and butane (iso and normal) are effective as the liquid vaporizable hydrocarbon solvent. The amount of noncondensible gas used is small. Downward flow of mobile water enhances the production rate significantly.

The hydrocarbon solvent may be injected in the vapor state with the displacement gas, but this is not preferred as it is difficult to maintain vapor saturation in the displacement gas.

TABLE 1

| Experiment No. | k $\mu m^2$ | $\phi$ | Crude | $S_o$ | Solvent |
|---|---|---|---|---|---|
| Butex6 | 192.4 | 0.32 | LM | 0.91 | Butane + $N_2$ |
| Lex1 | 195.8 | 0.37 | LM | 0.79 | Butane + $N_2$ |
| Lex2 | 194.0 | 0.33 | LM | 0.93 | Propane + $N_2$ |
| Lex3 | 195.0 | 0.35 | LM | 0.89 | i-$C_4$ + $N_2$ |
| Lex4 | 195.0 | 0.36 | LM | 0.87 | i-$C_4$, $H_2O$, $N_2$ |

| Experiment No. | Pressure | Ave. Temp. °C. | Configuration |
|---|---|---|---|
| Butex6 | 0.434 | 21.6 | Upward leaching |
| Lex1 | 0.779 | 21.8 | Top injection* |
| Lex2 | 0.959 | 21.5 LM | Top injection |
| Lex3 | 0.779 | 21.8 LM | Top injection |
| Lex4 | 0.779 | 21.8 LM | Top injection |

*well moved

A person skilled in the art could make immaterial modifications to the invention described and claimed in this patent without departing from the essence of the invention.

The embodiments of the invention in which an exclusive property or privilege is claimed are defined as follows:

1. A method for the recovery of hydrocarbons from an underground reservoir of hydrocarbons, the underground reservoir of hydrocarbons being penetrated by an injection well and a production well spaced from the injection well, the method comprising the steps of:

initially injecting a displacement gas into the injection well until a communication path is established between the injection well and the production well;

subsequently injecting the displacement gas along with a liquid vaporizable hydrocarbon solvent into the injection well to mobilize hydrocarbons in the underground reservoir; and producing mobilized hydrocarbons together with displacement gas and hydrocarbon solvent from the production well.

2. The method of claim 1 in which the production well lies predominantly horizontally in the underground reservoir.

3. The method of claim 1 in which the injection well is an existing horizontal production well lying at the top of the underground reservoir that was previously used to produce hydrocarbons from the underground reservoir.

4. The method of claim 3 in which:
   the production well is formed by drilling the production well into the underground reservoir below the injection well.

5. The method of claim 3 in which the injection well is in an array of predominantly horizontal injection wells spaced from each other in the underground reservoir into which liquid vaporizable hydrocarbon solvent is injected and the production well is in an array of horizontal production wells in the underground reservoir located below the injection wells from which production wells mobilized hydrocarbons are produced.

6. The method of claim 1 in which the liquid vaporizable hydrocarbon solvent is injected into the reservoir of hydrocarbons at about the underground reservoir temperature.

7. The method of claim 1 in which the displacement gas is selected from the group consisting of methane, natural gas and nitrogen.

8. The method of claim 1 in which the liquid vaporizable hydrocarbon solvent includes hydrocarbons selected from the group consisting of $C_3$ or $C_4$ hydrocarbons and mixtures thereof.

9. The method of claim 1 in which the liquid vaporizable hydrocarbon solvent is dry.

10. The method of claim 1 in which the amount of liquid vaporizable hydrocarbon solvent injected in the injection well is sufficient to maintain displacement gas in the reservoir saturated with vapor from the liquid vaporizable hydrocarbon solvent.

11. Apparatus for the recovery of hydrocarbons from a reservoir of hydrocarbons, the apparatus comprising:

a source of liquid vaporizable hydrocarbon solvent;

a source of displacement gas;

a first injection well drilled horizontally into the reservoir, the injection well having a portion open to fluid communication with the reservoir and being connected to the source of liquid vaporizable hydrocarbon solvent and the source of displacement gas; and a first production well drilled horizontally into the reservoir, and spaced from the injection well, the first production well including a pump for pumping oil from the well.

12. The apparatus of claim 11 further including a solvent stripper connected between the first injection well and the first production well.

13. The apparatus of claim 11 in which the first production well is below the first injection well.

14. The apparatus of claim 11 further including a gas recovery system attached to the production well.

15. A method for the production of hydrocarbons from a reservoir of hydrocarbons having a first horizontal well drilled into the reservoir of hydrocarbons, the method comprising the steps of:

drilling a second horizontal well into the reservoir of hydrocarbons spaced from the first horizontal well;

initially establishing a communication path with flow of displacement gas from the first horizontal well to the second horizontal well;

injecting a liquid hydrocarbon solvent into the reservoir of hydrocarbons through the first horizontal well along with displacement gas such that hydrocarbon solvent in the vapor state is present in the displacement gas in the reservoir; and producing hydrocarbons and displacement gas from the second horizontal well.

16. The method of claim 15 in which the hydrocarbon solvent is selected from the group consisting of $C_3$ and $C_4$ hydrocarbons.

17. The method of claim 16 in which the reservoir of hydrocarbons is a bitumen reservoir.

18. A method for the recovery of hydrocarbons from an underground reservoir of hydrocarbons, the method comprising the steps of:

injecting a displacement gas and a liquid vaporizable hydrocarbon solvent into an injection well lying in the underground reservoir to mobilize hydrocarbons in the underground reservoir; and producing mobilized hydrocarbons together with displacement gas and hydrocarbon solvent from a predominantly horizontal production well lying in the underground reservoir spaced from the injection well.

19. A method for the recovery of hydrocarbons from an underground reservoir of hydrocarbons, the underground reservoir having previously been produced by an existing horizontal production well lying at the top of the underground reservoir, the method comprising the steps of:

injecting a displacement gas and a liquid vaporizable hydrocarbon solvent into the existing production well lying in the underground reservoir to mobilize hydrocarbons in the underground reservoir; and producing mobilized hydrocarbons together with displacement gas and hydrocarbon solvent from a production well lying in the underground reservoir spaced from the injection well.

20. The method of claim 19 in which:

the production well is formed by drilling the production well into the underground reservoir below the existing production well.

21. The method of claim 19 in which the injection well is in an array of predominantly horizontal injection wells spaced from each other in the underground reservoir into which liquid vaporizable hydrocarbon solvent is injected and the production well is in an array of horizontal production wells in the underground reservoir located below the injection wells from which production wells mobilized hydrocarbons are produced.

22. A method for the production of hydrocarbons from a reservoir of hydrocarbons having a first horizontal well drilled into the reservoir of hydrocarbons, the method comprising the steps of:

drilling a second horizontal well into the reservoir of hydrocarbons spaced from the first horizontal well;

establishing a communication path with flow of displacement gas from the first horizontal well to the second horizontal well;

injecting a hydrocarbon solvent in the liquid phase into the reservoir of hydrocarbons through the first horizontal well while injecting displacement gas such that hydrocarbon solvent in the vapor state is present in the displacement gas in the reservoir; and producing hydrocarbons and displacement gas from the second horizontal well.

23. The method of claim 22 in which the hydrocarbon solvent is selected from the group consisting of $C_3$ and $C_4$ hydrocarbons.

24. The method of claim 23 in which the reservoir of hydrocarbons is a bitumen reservoir.

\* \* \* \* \*